ABSTRACT OF THE DISCLOSURE

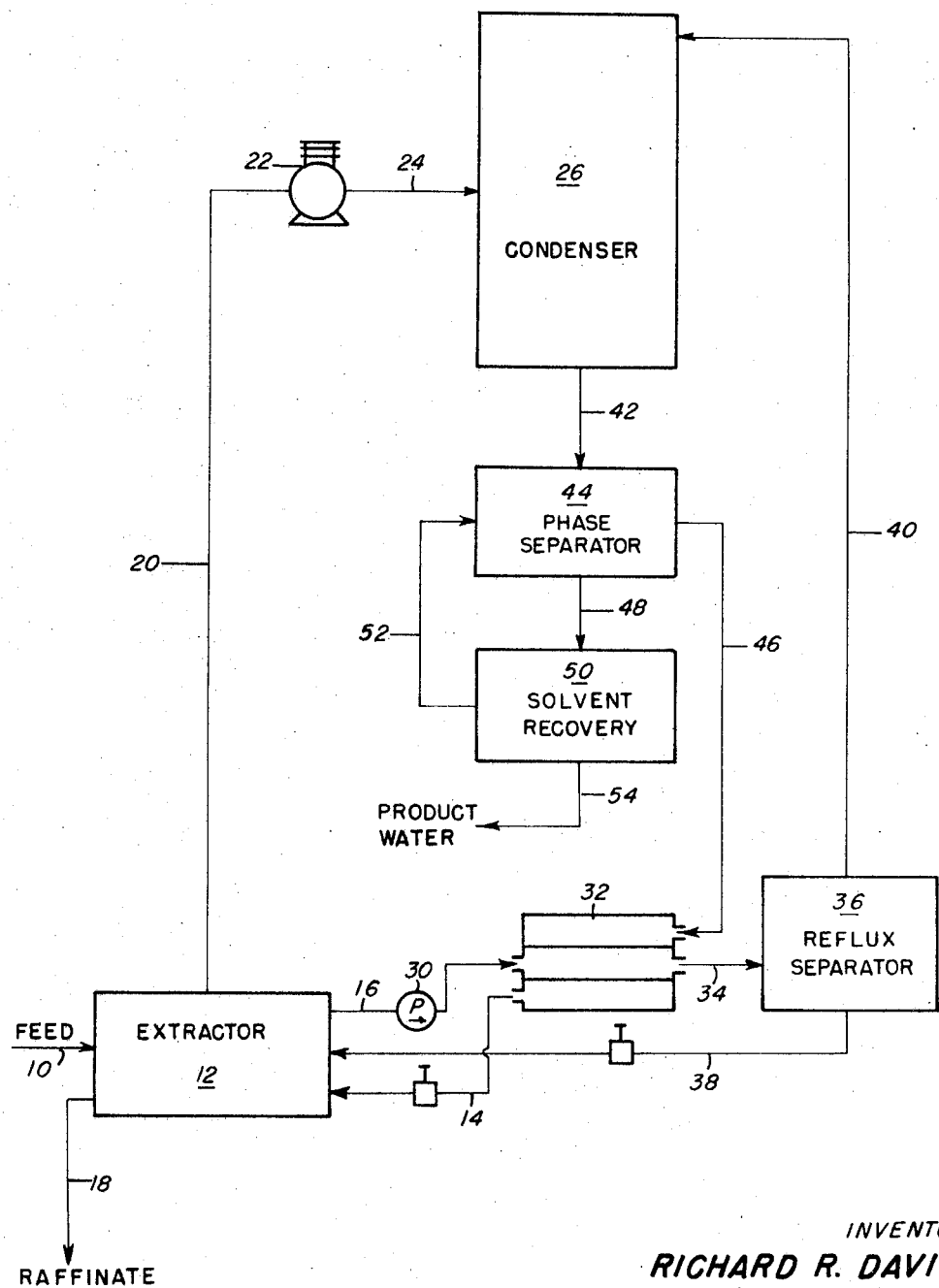

Efficiency of a water extraction process using an amine solvent is increased by vaporizing part of the fluids in the extraction zone, compressing those vapors and utilizing the latent heat of vaporization and the heat of compression to effect a separation of the extract into water-rich and solvent-rich phases.

---

This invention resulted from work done under Contract No. 14-01-0001-282 with the Office of Saline Water of the Department of the Interior. Pursuant to the requirements of the Saline Water Act. 42 U.S.C. 1951–1958g (1964), the domestic title to the invention is in the Government.

This invention relates to purification of saline water by solvent extraction. In particular, a system is employed for extracting water from saline solutions by using organic solvents which are partially miscible with water and which are largely non-solvents for salts. In the novel method of this invention the extraction zone of the process is cooled by evaporation of solvent and water vapors to move heat of solution from the extraction zone and to maintain a low-temperature operating condition in the extraction zone.

In U.S. Patent 3,088,909 to Davison and Hood, there is described a method for extracting water from saline solutions in which solvents, such as secondary and tertiary amines, having a large change in solubility for water at different temperatures are employed. Also, the solvents used contain strong electro-negative atoms within the molecule that have the property of forming hydrogen bonds with water molecules. Another important property of these solvents is the high selectivity for water over salt. This results in a high salt content in the raffinate phase of the extraction zone, and a low salt content in the extract phase. The selectivity ratio for solvent extraction processes is defined as the salt content of the raffinate phase divided by the salt content of the extract phase. As a result of the combined properties of the solvent, there are formed two phases, the raffinate being a water-rich phase having a high salt content, and the extract being a solvent-rich phase having a low salt content. The system property which allows recovery of the water present in the extract phase is the inverse solubility or partial miscibility curve for the water-amine mixture. When the extract mixture is heated it breaks down into a water-rich phase and a solvent-rich phase. From these components a product water may be recovered from the water-rich phase and the solvent-rich phase may be recirculated, after appropriate cooling, to the extraction zone for further extraction of water from saline solutions. The economies of such system depend largely on the efficiency of transfer of thermal energy and on the cost of recovering organic solvent from the raffinate and the product streams.

During the extraction of water from saline solutions, heat is generated in the extraction zone. The rise in temperature which accompanies such heat generation has a substantial effect on the amount of water extracted by a given quantity of solvent. Ordinarily a large amount of external heating and cooling of the streams in the system must be applied to effect solvent extraction.

It has been discovered that heat generated during the extraction step may be removed simultaneously and a correspondingly-low extraction temperature may be maintained by vaporizing some of the liquid in the extraction zone. This may be accomplished by operating the extraction zone under a low pressure. Vapors of the solvent and water are removed from the extraction zone under a low pressure, and their latent heats of evaporation are sufficient to remove heat generated by the transport of water molecules from the saline solution feed into the solvent phase.

Accordingly, it is an object of this invention to provide an improved solvent extraction system for removing water having a lessened salt content from saline solutions.

In particular it is an object of this invention to present novel methods and apparatus for contacting a saline water feed with a relatively volatile amine solvent having an inverse solubility curve with water whereby water molecules are transported from the feed into an extract phase with concurrent increase in the salt content of the feed stream. It is a further object to remove heat from the extraction zone by vaporizing solvent and water, thereby maintaining low temperatures in the extraction zone.

Another object of this invention is in the use of a compressor for removing vapors from the extraction zone and for adiabatically compressing the vapors to a higher temperature. In conjunction with this aspect of the invention the compressed vapors are contacted with the extract liquid to provide heat energy for separating the extract liquid into a solvent-rich phase and a water-rich phase.

These and other objects and features of the instant invention will be seen more clearly in the description following and in the appended drawing in which the single figure is a diagrammatic flow sheet.

The drawing shows a typical continuous process and apparatus for solvent extraction employing the principles of the invention. The saline water feed stream 10 is fed to the extractor 12 at ambient temperature or at the temperature of the extraction zone. The feed stream is contacted with an amine solvent, such as triethylamine, from solvent recycle line 14. Normally, the extraction step is carried out countercurrently, with extract reflux if necessary, at a temperature such that the extract contains about 30–35% water, the concentration being limited by a decrease in selectivity with increasing water content. The number of stages and the extract reflux rate depend on the concentration of feed, product and raffinate. The various stages of the extractor 12 contain two liquid phases, one water-rich and having an increased salt content (the raffinate), and one solvent-rich and having a low salt content (the extract). The raffinate stream 18 is withdrawn from the system and may be discarded or utilized as a concentrate. The solvent carried off by the raffinate stream 18 may be recovered and returned to the process, as will be described later. The extract liquid is withdrawn from the extractor 12 by line 16. This liquid stream contains most of the solvent amine from recycle line 14, plus most of the water present in feed stream 10. The temperature of the extraction zone is maintained at a low value (preferably close to ambient) by vaporizing a portion of the liquid solvent and water. By selection of a proper volatile amine, the reversibilities of the system may be controlled to obtain a thermodynamically efficient process. The use of a water-triethylamine mixture provides a vapor mixture having a composition nearly the same as the recycled solvent in line 14, and also very close to the azeotropic composition for the mixture. The particular example shown removes the vapors from the extractor 12 through vapor line 20, which is connected to the suction side of a single-stage compressor 22, where the vapors are compressed substantially adiabatically and discharged through high-pressure line 24 into condenser 26, where the vapors are directly contacted with low-temperature extract liquid, as discussed below, thereby condensing the vapors and heating the extract. Any conventional apparatus for gas-liquid contact may be used as condenser 26. For instance, a packed column, baffled shell, or bubble-plate contacter may be used.

In the separation of the product water from the solvent, a two-step heating process is employed in the present example. When the extract liquid phase leaves the extractor 12, it carries with it a relatively small quantity of salt. However, the object of the process is to remove a high amount of this salt to produce a pure product. Therefore, for saline water feed stocks containing a large amount of solute, it is necessary to reflux a portion of the extract stream back to the extractor 12. Since the extract liquid in line 16 is an equilibrium mixture, a slight heating of the liquid above the equilibrium temperature will result in a phase separation. The extract liquid stream 16 from the extractor 12 is raised in pressure by pump 30 and is passed to heat exchanger 32, where a slight amount of heating takes place. This is sufficient to effect a separation of the extract liquid into a water-rich reflux phase and a major solvent-rich extract stream, which mixture of liquids is withdrawn from the heat exchanger 32 through liquid line 34 and the phases are divided in reflux separator 36. The water-rich reflux stream 38 is returned to the extractor 12, carrying with it a portion of the undesired salt taken into the extract liquid during the extraction step.

The extract liquid continues through the system via liquid line 40, discharging at a high pressure into condenser 26, where the extract liquid is heated by contact with the vapors from the compressor 22.

The condensed vapors and extract liquid from input lines 24 and 40 to the condenser combine in a two-phase liquid output withdrawn at line 42. The water-rich phase and the liquid-rich phase are divided by phase separator 44; and the solvent-rich phase, which has been heated by the condensed vapors, is recycled to the extractor 12. In order to improve the thermodynamic efficiency of the system, it is desirable to remove a portion of the thermal energy of the solvent stream 46. This is accomplished by exchanging heat with extract liquid stream 16 in heat exchanger 32. The recycled solvent stream is thereby cooled to a temperature more nearly corresponding to that of the extraction zone.

From the phase separator 44 comes a solvent-laden water product stream 48. In order to operate the system under economical conditions, it is necessary to remove the expensive solvent from the product water. This is done in a solvent recovery zone 50, which may be a stripper utilizing low quality heat such as stream to vaporize the volatile amines used as solvents. The recovered amine is returned to the phase separator through line 52 and the product water is shown as being recovered at line 54. As previously indicated, some solvent may be lost from the extractor in the raffinate stream 18. This solvent may also be recovered in a like manner and be returned to the process with solvent stream 52. The point of return for the recovered solvent is not critical; for instance, the amine may be returned at lines 14 or 46.

EXAMPLE

In conjunction with the drawing the following table of stream compositions, temperature, pressure, enthalpy, and pressure conditions should be considered. In this table, $Q$ equals the total flow in relative weight units based on the product flow (pounds per 1000 gallons);

$Q_w$ equals the water fraction of the total flow;

$Q_{am}$ equals the amine fraction of the total flow (in this example the amine is triethylamine);

$Q_s$ equals the salt fraction of the total flow;

$H$ equals the enthalpy of the streams;

$T$ equals the stream temperature in degrees Fahrenheit; and $P$ equals the absolute pressure in millimeters of mercury.

Table 1

Feed (line 10):
  $Q=9166\#$
  $Q_w=9120\#$
  $Q_s=46\#$
  $P=55$ mm.
  $T=77°$ F.
  $H=45$ B.t.u./#$\times 9166\#=412,470$ B.t.u.

Raffinate (line 18):
  $Q=892\#$
  $Q_{am}=58\#$
  $Q_s=42\#$
  $Q_w=792\#$
  $P=55$ mm.
  $T=67°$ F.
  $H=29.84$ B.t.u./lb.$\times 892\#=26,617$ B.t.u.

Reflux (line 38):
  $Q=2767\#$
  $Q_{am}=249\#$
  $Q_s=2.5\#$
  $Q_w=2515\#$
  $P=110$ mm.
  $T=68°$ F.
  $H=28.85$ B.t.u./#$\times 2767\#=79,828$ B.t.u.

Extract from extractor (line 16):
  $Q=41,407\#$
  $Q_{am}=28,535\#$
  $Q_s=7\#$
  $Q_w=12,865$
  $P=55$ mm.
  $T=67°$ F.
  $H=-7.3$ B.t.u./#$\times 41,407\#=-302,271$ B.t.u.

Solvent to extractor (line 14):
  $Q=35,796\#$
  $Q_{am}=33,416\#$
  $Q_w=2,380\#$
  $P=110$ mm.
  $T=76.6°$ F.
  $H=13.59$ B.t.u./#$\times 35,796\#=486,341$ B.t.u.

Vapors from extractor (line 20):
  $Q=5430\#$
  $Q_{am}=5072\#$
  $Q_w=358\#$
  $T=67°$ F.
  $P=55$ mm.
  $H=231$ B.t.u./#$\times 5430\#=1,254,330$ B.t.u.

Vapors from the compressor (line 24):
  $Q=5430\#$
  $Q_{am}=5072\#$
  $Q_w=358\#$
  $T=106°$ F.
  $P=110$ mm.
  $H=242.16$ B.t.u./#$\times 5430\#=1,314,929$ B.t.u.

Extract from reflux separator (line 40):
  $Q=38,640\#$
  $Q_{am}=28,286\#$
  $Q_s=4\#$
  $Q_w=10,350\#$
  $T=68°$ F.
  $P=110$ mm.
  $H=-5.80$ B.t.u./#$\times 38,640\#=-224,112$ B.t.u.

Solvent to exchanger (line 46):
  $Q=35,796\#$
  $Q_{am}=33,416\#$
  $Q_w=2,380\#$
  $T=85°$ F.
  $P=110$ mm.
  $H=18$ B.t.u./#$\times 35,796\#=644,328$ B.t.u.

Product from separator (line 48):
 $Q=8750\#$
 $Q_{am}=417\#$
 $Q_s=4\#$
 $Q_w=8,329\#$
 $P=110$ mm.
 $T=85°$ F.
 $H=51.7$ B.t.u./$\#\times 8750\#=452,375$ B.t.u.
Amine return (line 52):
 $Q=417\#$
 $H=26$ B.t.u./$\#\times 417\#=10,842$ B.t.u.
 $T=85°$
 $P=110$ mm.

Discrepancies in the balancing of materials and thermodynamic quantities in the above data resulted from the assumptions made in certain of the calculations made.

A single-stage compressor 22, operating at 80% efficiency, would have a work value of 17.75 kilowatt-hours per 1000 gallons for the example given. A large number of compression stages may be used in the process, but such is not usually practical. One modification of the system involves the use of two compressors wherein the output from the first stage is partially contacted with the extract liquid in a first condenser, and the output of the second compressor is contacted with the extract in a second condenser. The more compression stages and corresponding condensers used, the more efficient the process; but as this increases the equipment cost, an economic balance is involved in choosing the optimum number.

The solvent used in the preferred embodiment is triethylamine; but, the use of other suitable amines, such as methyldiethylamine (which has a separation temperature of 167° F. and an extraction temperature of 125° F.) is feasible. Other suitable solvents are dimethylisopropyl amine and ethylisopropyl amine. A larger number of suitable amine solvents are disclosed in prior publications, especially J. Chem. Eng. Data, vol. 5, p. 420 (1960), and Advances in Chemistry Series No. 27, p. 40 (1960).

The invention has been illustrated by specific example but there is no intent to limit the invention to the specific details so disclosed in the description and drawing, except insofar as set out in the following claims.

What is claimed is:

1. A method for purifying saline water by solvent extraction which comprises the following steps:
 (a) contacting under low pressure a saline water feed stream in an extraction zone with an amine solvent having an inverse partial miscibility curve with water, to transport water from the feed into an extract phase and to concentrate salt in a raffinate phase;
 (b) vaporizing sufficient quantities of solvent and water in said extraction zone to remove heat generated by the transport of water molecules from the saline solution feed into the solvent phase and removing the vapors from said zone.
 (c) compressing the vapors from step (b) above;
 (d) slightly heating the extract phase from step (a) above to cause a minor amount of water to separate from said extract phase;
 (e) returning said separated minor amount of water to the extraction zone as reflux;
 (f) directly contacting compressed vapors from step (c) above with extract phase from step (d) above, thereby condensing the vapors and heating the extract liquid and forming a solvent phase and a product water phase, and
 (g) returning the solvent phase from step (f) above to the extraction zone.

2. A method according to claim 1 wherein the solvent phase from step (f) is passed in indirect heat exchange relationship with the extract phase from step (a) prior to returning said solvent phase to the extraction zone.

3. A method according to claim 2 wherein solvent is recovered from the product phase.

4. A method according to claim 3 wherein solvent is stripped from the raffinate phase.

5. A method according to claim 2 wherein the solvent is triethylamine, methyldiethylamine, dimethylisopropyl amine, or ethylisopropylamine.

6. A method according to claim 5 wherein said solvent comprises triethylamine.

7. A method according to claim 6 wherein said extract phase from step (a) is heated to a temperature on the order of 1° F. above the temperature maintained in the extraction zone to cause separation of a minor amount of water from said extract phase.

8. A method according to claim 7 wherein said extract phase from step (d) is heated to a temperature on the order of 20° F. above the temperature maintained in the extraction zone.

References Cited

UNITED STATES PATENTS 3,088,909  5/1963  Davison et al. _____ 210—22
3,350,298  10/1967  Carr _____ 210—252 X

OTHER REFERENCES

Davison et al.: "Development of the Solvent Demineralization of Saline Water," Saline Water Research and Development Progress Report No. 55, received in Patent Office, May 8, 1962, pp. V-1 through V-3 and X-1 through X-4 relied on; for sale by U.S. Dept. of Commerce, Office of Technical Services.

SAMIH N. ZAHARNA, Primary Examiner.

FRANK A. SPEAR, JR., Assistant Examiner.

U.S. Cl. X.R.
210—187, 259, 511